Oct. 16, 1962 R. A. THOMAS 3,058,250

FISHING ROD HOLDER

Filed May 8, 1961

INVENTOR.
REX A. THOMAS

United States Patent Office 3,058,250
Patented Oct. 16, 1962

3,058,250
FISHING ROD HOLDER
Rex A. Thomas, Box 222, Athena, Oreg.
Filed May 8, 1961, Ser. No. 108,394
1 Claim. (Cl. 43—17)

This invention relates generally to fishing tackle, and more specifically to a rod holding device.

It is a primary object of this invention to provide a fishing rod holder and support which serves several purposes, thereby reducing the number of necessary items under the general term of fishing tackle.

It is a still further object of this invention to provide a fishing rod holder of the above class which incorporates an alarm device which warns the fisherman of a bite.

Briefly, the invention involves a steel rod which is adapted to be engaged vertically into the ground and terminates at the upper end with a handle and rod supporting means. The rod has a sleeve mounted thereon in a concentric manner and has insulation separating the same from the rod. An electric potential is applied between the sleeve and the rod and an electric circuit is closed through the soil at the lower ends of the rod and sleeve. A fishing rod is pivotally supported in a tube at one end to the lower end of the handle and is retained in an upwardly inclined stance by means of a tension spring. A short length of cord connects between the tube and an alarm bell, such that a bite and resulting pull on the end of the line will cause the tension spring to oscillate permitting the cord to operate the alarm bell.

A full understanding of the details of the invention, together with further advantages, will become apparent by reference to the following detailed description of a preferred embodiment thereof, taken in conjunction with the attached drawings wherein.

Similar reference characters indicate corresponding parts throughout the several views in the drawing.

Figure 1:
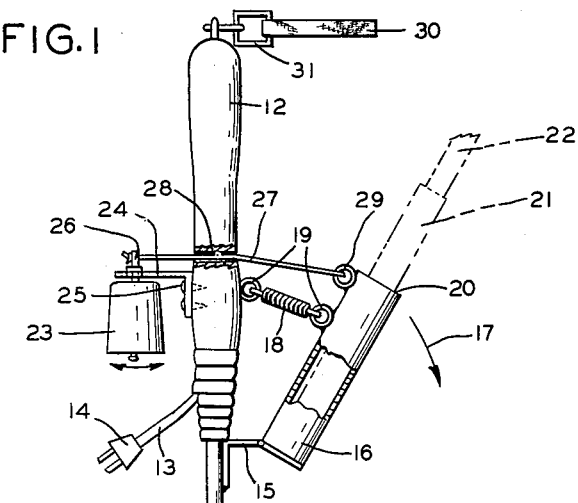
FIG. 1 is a side elevation shown partly in cross section of the device of my invention operatively mounted in the ground and supporting the handle end of a fishing rod.
Figure 2:
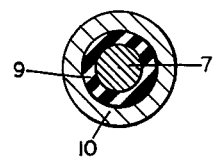
FIG. 2 is a cross sectional plan view taken along the lines 2—2 of FIG. 1.
Figure 3:
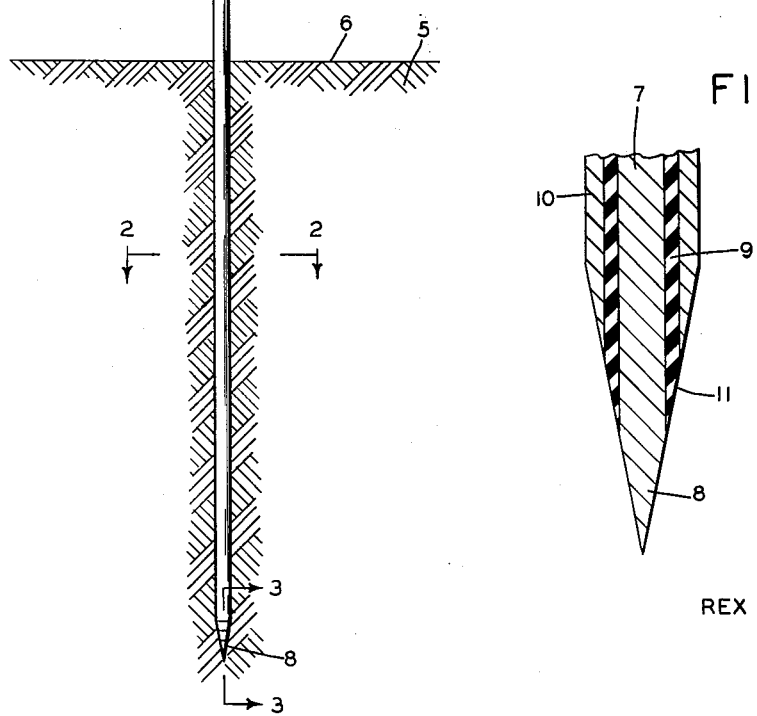
FIG. 3 is an enlarged fragmentary view of the lower end of the support rod, shown in cross section and taken along the lines 3—3 of FIG. 1.

Referring now to the drawings in detail, the numeral 5 represents the ground having a top surface 6. A steel support rod 7 has a pointed lower end 8 and is surrounded about its length by a suitable insulating sleeve 9. A metal sleeve 10 extends over the sleeve to form an outer conductor. The lower ends of the sleeve 10, the insulator 9 and the rod 7, is tapered as indicated at 11, such that the pointed end 8 of the rod extends beyond the insulating sleeve 9.

Mounted about the upper end of the sleeve 10 is a shaped handle 12 preferably of insulating material. An electric cable 13 having a plug 14 has two wires, not shown, one connecting with the steel support rod 7 and the other with the metal sleeve 10, such that a potential can be caused therebetween. A hinged strap 15 connects the lower end of a closed tube 16 with the sleeve 10, for vertical movement of the tube in an arcuate plane as indicated by the arrow 17. A tension spring 18 is secured between eyelets 19 mounted on an upper portion of the tube 16 and the handle 12. The spring restricts arcuate movement of the tube 16 and maintains the same at an upwardly inclined angle. The tube 16 is open at the upper end 20 and removably accepts the handle end 21 of a fishing rod 22.

The alarm comprises a small bell 23 which is suspended from a rearwardly projecting bracket arm 24 secured by screws 25 to the handle 12 diametrically opposed to the tension spring 18. The bell is loosely suspended and has an eyelet 26 projecting through the bracket. A short nylon cord 27 is secured at one end to the eyelet 26 and extends through a hole 28 formed diametrically through the handle to terminate with an eyelet 29 sealed to the upper edge of the tube 16. It will be clear that arcuate movement of the tube 16 caused by a biting fish on the end of the line will cause the spring 18 to oscillate and the cord to move back and forth through the hole 28. Such reciprocating movement causes the bell 23 to ring.

A short strap 30 may be secured by means of a swivel clip 31 to the upper end of the handle 12 for convenience in carrying the device.

Having described the invention in a preferred form, it will be appreciated that some modifications may be made to the precise configuration, without departing from the scope or spirit of the invention, as defined by the following claim.

I claim:

A fishing rod holder for supporting the handle portion of a fishing rod, and comprising, a steel support rod for engaging vertically in the ground, said support rod being tapered to form a point at its lower end, a handle mounted on the upper end of the support rod, a tube having a closed lower end pivotally supported at its lower end to the support rod adjacent the handle for arcuate movement in a vertical plane, said tube being open at its outer end and adapted to removably receive the handle portion of the fishing rod, a tension spring extending between the tube and the handle to maintain the tube in an upwardly inclined direction with respect to the rod, an alarm means responsive to arcuate movement of the tube with respect to the handle and comprising, a bell, a bracket arm secured to the handle and projecting normally thereto in said vertical plane diametrically opposite to said tube, an eyelet formed on the top of the bell, said bracket arm having an opening therein and said handle having a transverse opening therethrough, said eyelet projecting upwardly through the bracket arm opening, a cord secured to the eyelet and extending through the transverse opening in the handle to terminate in fixed engagement with the outer end of the tube, said cord transmitting movement of the tube to the bell and causing the same to ring.

References Cited in the file of this patent

UNITED STATES PATENTS

| | | |
|---|---|---|
| 464,865 | Guelich | Dec. 8, 1891 |
| 467,123 | Kunzel | Jan. 12, 1892 |
| 1,932,237 | Warner | Oct. 24, 1933 |
| 2,450,597 | Karnowski | Oct. 5, 1948 |
| 2,720,048 | Bracey et al. | Oct. 11, 1955 |
| 2,745,088 | Bauer | May 8, 1956 |
| 2,770,075 | Moore | Nov. 13, 1956 |
| 2,816,388 | Hartley | Dec. 17, 1957 |
| 2,909,860 | Braun | Oct. 27, 1959 |
| 2,921,399 | Huliew | Jan. 19, 1960 |

FOREIGN PATENTS

| | | |
|---|---|---|
| 852,316 | Germany | Oct. 13, 1952 |